US012176176B2

(12) United States Patent
Feist et al.

(10) Patent No.: US 12,176,176 B2
(45) Date of Patent: Dec. 24, 2024

(54) ROTATING X-RAY ANODE

(71) Applicant: PLANSEE SE, Reutte (AT)

(72) Inventors: Christian Feist, Innsbruck (AT); Stefan Gerzoskovitz, Reutte (AT); Juergen Schatte, Reutte (AT); Arno Plankensteiner, Reutte (AT); Christian Bienert, Reutte (AT); Karl Huber, Reutte (AT)

(73) Assignee: Plansee SE, Reutte (AT)

( * ) Notice: Subject to any disclaimer, the term of this patent is extended or adjusted under 35 U.S.C. 154(b) by 224 days.

(21) Appl. No.: 17/798,635

(22) PCT Filed: Nov. 9, 2020

(86) PCT No.: PCT/EP2020/081430
§ 371 (c)(1),
(2) Date: Aug. 10, 2022

(87) PCT Pub. No.: WO2021/160303
PCT Pub. Date: Aug. 19, 2021

(65) Prior Publication Data

US 2023/0154718 A1 May 18, 2023

(30) Foreign Application Priority Data

Feb. 10, 2020 (AT) .......................... GM 50022/2020

(51) Int. Cl.
*H01J 35/10* (2006.01)

(52) U.S. Cl.
CPC ....... *H01J 35/101* (2013.01); *H01J 2235/086* (2013.01); *H01J 2235/1006* (2013.01); *H01J 2235/1204* (2013.01)

(58) Field of Classification Search
CPC ............... H01J 35/101; H01J 2235/086; H01J 2235/1006
See application file for complete search history.

(56) References Cited

U.S. PATENT DOCUMENTS 3,795,832 A * 3/1974 Holland .................. H01J 35/10 378/127
4,344,012 A * 8/1982 Hubner ................. H01J 35/108 313/311
(Continued)

FOREIGN PATENT DOCUMENTS

DE 102008036260 A1 2/2010
EP 0016485 A1 10/1980
(Continued)

OTHER PUBLICATIONS

JP S58-142750 A English translation of Description (Year: 1983).*
English translation for JP S51-147987 A (Year: 1976).*

*Primary Examiner* — Chih-Cheng Kao
(74) *Attorney, Agent, or Firm* — Laurence A. Greenberg; Werner H. Stemer; Ralph E. Locher

(57) ABSTRACT

A rotating X-ray anode for generating X-radiation has an annular main body made of carbon-based material, an annular focal track covering, which is arranged on a focal track side of the main body, and a metal connection component, which is arranged radially inside relative to the main body. A radially outer portion of the connection component is formed by a tubular metal adapter. The radial outside surface of the adapter is at least partly joined, face to face and integrally, to at least a portion of the radial inside surface of the main body. An integral joining zone between the main body and the adapter extends over at least 75 percent of the area of the radial inside surface of the main body.

13 Claims, 10 Drawing Sheets

(56) References Cited

U.S. PATENT DOCUMENTS

| | | | | |
|---|---|---|---|---|
| 4,574,388 | A | 3/1986 | Port et al. | |
| 4,958,364 | A | 9/1990 | Guerin et al. | |
| 5,446,778 | A | 8/1995 | Schmidt et al. | |
| 5,498,186 | A | 3/1996 | Benz et al. | |
| 5,498,187 | A | 3/1996 | Eggleston et al. | |
| 6,413,021 | B1 | 7/2002 | Koch et al. | |
| 7,184,520 | B1 * | 2/2007 | Sano | H01J 35/1017 378/132 |
| 8,014,495 | B2 | 9/2011 | Lenz | |
| 9,682,433 | B2 | 6/2017 | Choi et al. | |
| 2007/0269015 | A1 * | 11/2007 | Raber | H01J 35/105 378/144 |
| 2010/0027754 | A1 | 2/2010 | Lenz | |
| 2011/0096909 | A1 * | 4/2011 | Le-Guet | H01J 35/10 378/197 |

FOREIGN PATENT DOCUMENTS

| | | | |
|---|---|---|---|
| EP | 1083017 | A1 | 3/2001 |
| GB | 2062953 | A | 5/1981 |
| JP | S51147987 | A | 12/1976 |
| JP | S58142750 | A | 8/1983 |
| WO | 2014104667 | A1 | 7/2014 |

* cited by examiner

ROTATING X-RAY ANODE

FIELD AND BACKGROUND OF THE INVENTION

The present invention relates to a rotary x-ray anode as claimed in claim 1.

Rotary x-ray anodes are utilized in x-ray tubes, which are used, for example, in imaging processes in medical diagnostics or for material examinations in research and industry. During operation of the x-ray tubes, electrons emitted by a cathode are accelerated onto the rotary x-ray anode that rotates about an axis, with x-radiation being produced as a result of the interaction of the high-energy electrons with the anode material. Most (approx. 99%) of the energy of the electron beam is converted into heat in the process and has to be dissipated. In the case of rotary x-ray anodes, the cooling is normally primarily effected by thermal radiation from the surface of the rotary x-ray anode.

Known rotary x-ray anodes generally consist of a composite body with a disk-shaped or plate-shaped basic body of high-temperature-resistant material (usually a molybdenum alloy or a composite of a molybdenum alloy with graphite), on one side of which an annular focal track coating of an x-ray generating material (usually tungsten or a tungsten alloy) is arranged. The disk-shaped or plate-shaped basic body is connected to a rotor via a shaft and is driven by said rotor. During operation of the rotary x-ray anode, the focal track coating at the point of impingement of the electrons, the focal spot, is subject to extremely high thermal loads. Since the focal spot moves further over the surface of the focal track coating cyclically owing to the rotation of the rotary x-ray anode, the electrons continuously impinge on focal track coating material that has cooled down again in the meantime and the input of heat can be quickly distributed over the rotary x-ray anode. Rotary x-ray anodes can therefore be operated at significantly higher power outputs than stationary anodes.

The present invention focuses on rotary x-ray anodes that have a low mass and are suitable for higher rotational frequencies. Many applications require a higher radiation intensity, this leading to higher power densities and a higher local input of heat in the focal spot region. In order to counteract this, there is interest in higher focal spot velocities; for a given focal track diameter, this is equivalent to an increase in the rotational frequency of the rotary x-ray anode. In the case of conventional rotary x-ray anode designs, the maximum possible rotational frequencies are limited: In addition to the cyclic, thermally induced stresses, the material of the rotary x-ray anode has acting on it centrifugal forces, which in the case of disk-shaped or plate-shaped rotary x-ray anodes lead to peripheral stresses which are highest in the region of the inner circumference of the rotary x-ray anode. The consequences of this thermomechanical loading are plastic deformations in metal or composite rotary anodes, often associated with crack formations, in particular in the outside and inside diameter region of the rotary x-ray anode, and limit the service life of the rotary x-ray anode. Another disadvantage of conventional metal or composite rotary anodes is that they are mounted on a thin-walled, cup-shaped stem for high-power applications in order to control the heat flow to the bearing. This leads to a large overall height and reduces the mechanical stiffness. The resulting low-frequency natural frequency spectrum does not allow high rotational speeds required by modern high-power rotary x-ray anodes. Not least, conventional metal or composite rotary anodes have a comparatively large mass, which subjects the bearing to load and is a hindrance for use at high rotational frequencies. An additional disadvantage is that, in the case of conventional metal or composite rotary anodes, the component serving as heat store has a low proportion by mass.

SUMMARY OF THE INVENTION

An object of the present invention is to further develop rotary x-ray anodes and to provide rotary x-ray anodes which have a mass that is as low as possible, with the result that high rotational frequencies are possible without the bearing being overloaded during operation. The rotary x-ray anode should additionally have an improved ability to bear thermomechanical loads. In particular, plastic deformations and crack formations, as can occur as described above in the case of disk-shaped or plate-shaped, molybdenum-based rotary x-ray anodes, should occur to a significantly reduced extent.

This object is achieved by a rotary x-ray anode as claimed in claim 1. Advantageous refinements of the invention are specified in the dependent claims.

The present invention proposes a rotary x-ray anode for generating x-radiation, which has an annular basic body of carbon-based material. With respect to an axial direction (defined by the axis of the annular basic body, it coincides with the axis of rotation of the rotary x-ray anode), the annular basic body has two opposite end faces, with an annular focal track coating being arranged on the end face—the focal track face—that faces the electron beam during operation. High-energy electrons are accelerated onto this focal track coating during operation of the rotary x-ray anode and x-radiation is produced as a result of the electrons interacting with the material of the focal track coating. With respect to a radial direction (runs outward from the axis of rotation and lies in a plane orthogonal to the axial direction), the annular basic body has a radially internal surface—the radial inner surface—which faces the axis of rotation and, opposite to said radially internal surface, a radially external surface, the radial outer surface. The annular basic body has a mechanically supporting function for the focal track coating and is important for heat absorption and heat storage.

The rotary x-ray anode also has a metallic connecting component which is arranged radially on the inside relative to the annular basic body and which serves to connect the annular basic body to a drive shaft. In the context of the present invention, the drive shaft is not considered to be part of the rotary x-ray anode.

The rotary x-ray anode according to the invention is further distinguished in that the radially outer portion of the metallic connecting component is formed by a tubular metallic adapter. The tubular adapter may be manufactured as an originally separate component, which is connected to one or more further part(s) to form the metallic connecting component. The tubular adapter may also be an integral partial portion of a connecting component manufactured monolithically—in this case, the tubular adapter is not a separately manufactured component. The radial outer surface of the adapter (corresponds at the same time to the radial outer surface of the metallic connecting component) is at least partially extensively materially bonded to at least one portion of the radial inner surface of the annular basic body. In this respect, the materially bonded connecting zone between the annular basic body and the metallic adapter extends at least 75, in particular 90, particularly preferably 95 area percent along the radial inner surface of the annular basic body. Expressed differently, the annular basic body and the metallic connecting component butt against one another primarily in the radial direction. Although the metallic connecting component can also protrude beyond the end face of the annular basic body and be materially bonded to the basic body along its end face, the basic body and the connecting component are materially bonded to one another primarily in the radial direction.

The radially inner portion of the metallic connecting component is formed by a metallic shaft connection component, which projects radially inward relative to the adapter. It can—in the same way as the tubular adapter—be manufactured as a separate component and be materially bonded to the tubular adapter, or as an alternative it may be a partial portion of a connecting component manufactured in one piece. The shaft connection component and/or the tubular adapter preferably have a thin-walled configuration.

Carbon-based materials are understood to mean, in particular, graphite or carbon fiber-reinforced carbon (carbon fiber carbon composite, CFC). Graphite is distinguished by an extremely low density and has a high specific heat capacity, which is important in order that the rotary x-ray anode can absorb and store large amounts of heat during operation. CFC materials consist of carbon fibers embedded in a pure carbon matrix. These give the material its high mechanical strength. The low density of these materials makes it possible for the basic body of the rotary x-ray anode to have a bulky configuration, with the result that it has a very high heat capacity, while at the same time the mass of the rotary x-ray anode can be kept comparatively low.

Annular is understood to mean a hollow-cylindrical shape of a body in which the wall thickness of the body in a radial direction is greater than the extent (height) in an axial direction. Tubular is understood to mean a hollow-cylindrical shape in which the wall thickness of the body in a radial direction is less than the height in an axial direction (given a varying wall thickness or height, reference is made to the greatest extent in a radial or axial direction, respectively).

The geometry of the annular basic body or of the tubular adapter is not limited to shapes with a geometrically exact hollow-cylinder geometry, i.e. the generatrices of the lateral surfaces do not necessarily have to be a straight line; they can in particular be curved. The shape is also not limited to a (continuous) rotational symmetry (symmetry with respect to rotation through any desired angle), but may, for example, also exhibit only an n-fold rotational symmetry with a natural number $n \geq 2$ (symmetry with respect to rotation through $360°/n$). In the following text, rotational symmetry will refer to a symmetry with respect to rotation through any desired angle.

The annular basic body may, for example, be beveled radially outward on the focal track side in that region in which the focal track coating is arranged. Annular or tubular is in particular also understood to mean when the shape in a radial section (a plane through the axial direction), for example the thickness of the ring wall or tube wall and/or the outer contour, changes in the axial direction, for example when it is a matter of a conical tube. Tubular in particular also includes a tube with cooling fins incorporated in its wall. In particular, tubular is also understood to mean a tube which has a portion that protrudes in the manner of a flange, for example in order to support the annular shaped body on its end face and to create an additional connection option on the end face.

The rotary x-ray anode according to the invention thus significantly differs in design terms both from the disk-shaped or plate-shaped rotary x-ray anodes mentioned at the outset and from concepts from the patent literature, such as the rotary anode in US20100027754 (Siemens), for example, in which an annular basic body of graphite—by contrast to the present invention—is mounted in the axial direction on a disk-shaped metallic connecting component. The present rotary x-ray anode also significantly differs from the rotary x-ray anode in EP0016485 (Philips) in which a graphite ring is arranged around a solid internal disk and there is no tubular adapter.

The rotary x-ray anode according to the invention has a series of advantages:

In comparison with conventional metal or composite rotary anodes, it is distinguished by a significantly lower mass. The lightweight construction is achieved through the use of carbon-based materials for the basic body and the slim design of the metallic connecting component.

In addition, the component serving as a heat store has an advantageously high proportion by mass. The annular configuration of the carbon-based basic body results in optimized exploitation of its heat storage capacity and allows relatively low equalizing temperatures between the electron beams and low mean cycle temperatures, respectively. By contrast to conventional metal or composite rotary anodes, there is no metallic connection, characterized by a low heat transfer resistance, between the focal track coating and the connecting component. This avoids pronounced temperature gradients along the materially bonded connecting zone between the basic body and the connecting component, and therefore subjects this connecting zone to thermomechanical load as uniformly as possible. The compact shape also ensures an increase in the lowest natural frequency, which, in addition to the low mass, meets a second important precondition in order to be able to use the rotary x-ray anode at high rotational speeds. Despite the use of a carbon-based basic body, even at high rotational speeds it is possible to ensure a small displacement on the outer circumference and only a small change, comparable to conventional metal or composite rotary anodes, in the focal track angle.

Advantageous further developments of the rotary x-ray anode are presented below, starting with further developments of the metallic connecting component. Many of the measures presented contribute to keeping the mass of the rotary anode low while still keeping the mechanical stresses manageable.

In a preferred variant, the outer circumference of the metallic adapter decreases in the axial direction, in particular in the direction of the focal track side, and the shape of the annular basic body is adapted accordingly. During operation of the rotary x-ray anode, this decrease in the direction of the focal track side has the effect in particular of a more uniform, in the optimum case approximately isothermal, temperature distribution along the connecting zone between the metallic adapter and the basic body. If the outer circumference of the adapter decreases in the direction of the focal track side, regions in the connecting zone between the adapter and the basic body that are spatially closer to the focal track coating in the axial direction are further away from the focal track coating in the radial direction. In this way, the different distances between the focal track coating and individual regions in the adapter/basic body connecting zone become more balanced, which has a positive effect on the temperature distribution and the associated thermally induced stresses along the connecting zone.

In an advantageous embodiment, the metallic connecting component is rotationally symmetrical, in particular the annular adapter is rotationally symmetrical.

Advantageously, the adapter has a frustoconical basic shape with a cone angle in the range between 155° and 205°, in particular between 155° and 180°, particularly preferably between 160° and 175°. Range specifications for the angle include the respective limit values. The cone angle refers to the orientation of the tangential plane of the adapter lateral surface relative to the axial direction; the cone angles are measured from the focal track side: A truncated cone with a cone angle of 180° corresponds to a hollow cylinder, a truncated cone with an angle in the range >90° and <180° tapers in the direction of the focal track side, a truncated cone with an angle >180° and <270° tapers in the opposite direction, and in this case the outer circumference of the metallic adapter thus increases in the direction of the focal track side. The advantage of frustoconical adapters is that, in particular for cone angles in the angle range between 160° and 175°, the approximately isothermal temperature profile, which is advantageous as explained in more detail above, can be set along the adapter/basic body connecting zone and the adapter can still be manufactured comparatively easily and cost-effectively.

A further advantageous embodiment for the adapter is a rotationally symmetrical shape, which also has symmetry with respect to a plane normal to the axial direction (plane of rotation). Loading on the bearing is also minimized. An example of such a shape is an adapter with a toroidal basic shape. In a radial section, the contact surface of the adapter with the basic body has the shape of an outwardly curved, open shell.

It has proven to be advantageous if the height of the adapter and the annular basic body in the connecting region are matched to one another, i.e. the height of the adapter in an axial direction corresponds to the height of the annular basic body in an axial direction in the connecting region.

The metallic shaft connection component is the radially inner portion of the metallic connecting component and can, as already explained above, be manufactured as a separate component which is then metallurgically bonded to the adapter radially on the inside. However, it may also be a partial portion of a connecting component manufactured monolithically. Unless explicitly stated otherwise, the following considerations should include both variants.

The metallic shaft connection component is connected on its radially outer circumference to the radial inner surface of the tubular adapter. The radially inner portion of the shaft connection component serves for direct or indirect connection to the drive shaft and may, for example, have openings for screw connections, by way of which the rotary x-ray anode is fixed on the drive shaft.

A preferred embodiment of the shaft connection component has a circular-disk-shaped basic shape. The shaft connection component preferably has the shape of an accurate circular disk. The disk is advantageously arranged in the plane of rotation. The disk does not need to be flat; rather, it may also have gradations (in that case, in a radial section, the shape is not rectilinear but may have one or more steps).

Instead of a disk, the shaft connection component may also have a frustoconical basic shape; in this case, the cone angle is preferably in a range between 90° and 100° (measured from the axial direction) or in a range between 260° and 270°. In this case, the shaft connection component is slightly tilted with respect to the plane of rotation in a radial section. A truncated cone with 90° or 270° corresponds to a disk lying in the plane of rotation. A truncated cone with an angle in the range >90° and <180° tapers in the direction of the focal track side, a truncated cone with an angle in the range >180° and <270° opens out in the direction of the focal track side.

The shaft connection component and/or the adapter may preferably have structurings, such as load-relieving slots or stiffenings, that interrupt the rotational symmetry. Load-relieving slots in the shaft connection component on the one hand help to save on mass and on the other hand can be useful in making the thermomechanical stresses occurring during operation easier to manage.

The center of gravity of the shaft connection component, particularly preferably also the radially inner portion of the shaft connection component to which the drive shaft is fastened, is preferably located in the axial direction within the extent of the adapter in the axial direction. In other words, the surface centroid or the radially inner portion of the shaft connection component does not lie outside the extent of the adapter in the axial direction. This compact design reduces loading on the bearings and increases the lowest natural frequency.

The shaft connection component is preferably connected substantially centrally to the radial inner surface of the adapter, in particular the shaft connection component is connected to the radial inner surface of the adapter in a range of 40% to 60% of the height of the adapter in the axial direction. Advantageously, the transition region in which the shaft connection component and the adapter abut one another is rounded and has no sharp-edged transitions.

If the shaft connection component and the adapter are manufactured separately, the metallurgical bond between the two components is preferably effected by means of a soldered connection. Zirconium in particular comes into consideration as solder.

The present rotary x-ray anode is distinguished overall by a slim design of the metallic connecting component, which has sufficient mechanical stability despite the thin-walled components. The adapter preferably has a thickness in the radial direction of less than 5 mm, but at least greater than 1.5 mm. The thickness of the shaft connection component in an axial direction is preferably less than 10 mm, in particular less than 5 mm, but at least greater than 1.5 mm. The maximum thickness of the shaft connection component in an axial direction is preferably less than 20%, in particular less than 15%, of the height of the adapter in an axial direction.

Suitable materials for the metallic connecting component in terms of thermal expansion are in particular molybdenum and molybdenum-based alloys (e.g. TZM, MHC), tungsten or tungsten-based alloys and also an alloy on the basis of copper. A molybdenum-based, tungsten-based or copper-based alloy refers to an alloy which comprises at least 50% by weight molybdenum, tungsten or copper, respectively. TZM refers to a molybdenum alloy with a titanium content of 0.5% by weight, a zirconium content of 0.08% by weight, a carbon content of 0.01%-0.04% by weight, and is otherwise made up of molybdenum (apart from impurities). MHC is understood in this connection to mean a molybdenum alloy that has a hafnium content of 1.0% to 1.3% by weight, a carbon content of 0.05% to 0.12% by weight, an oxygen content of less than 0.06% by weight and is otherwise made up of molybdenum (apart from impurities). The metallic connecting component may also comprise a tungsten-copper composite material, a molybdenum-copper composite material, a copper composite material, or a dispersion-strengthened alloy, such as a dispersion-strengthened copper alloy. What all these materials have in common is that they are high-temperature-resistant and have a comparatively low coefficient of thermal expansion. The metallic connecting component may in particular also be based on different materials, i.e. the shaft connection component and adapter may consist of different materials.

The metallic connecting component preferably comprises an intermediate component or an intermediate layer of a material with low thermal conductivity, in particular a ceramic material such as $ZrO_2$, for example. This intermediate component or intermediate layer acts as a heat restrictor and is intended to suppress the flow of heat in the direction of the rotary anode bearing to the greatest possible extent. The intermediate component serving as heat restrictor or the intermediate layer is preferably arranged in the radially inner region of the shaft connection component. The heat restrictor may be realized, for example, by a coating applied radially on the inside of the shaft connection component or by an annular disk arranged radially on the inside of the shaft connection component. Due to the improved thermal insulation of the rotary anode bearing, it is no longer necessary to mount it on a stem, as is required in the case of known high-performance rotary x-ray anodes. A compact rotary x-ray anode with a low overall height is thus achieved.

The metallic connecting component is materially bonded on its radial outer surface to the annular basic body via the tubular adapter. The material bond between the tubular adapter and the annular basic body is preferably effected by means of a soldered connection. Zirconium is preferably used as solder. The tubular adapter is advantageously soldered directly to the annular basic body. The material bond may optionally be reinforced by form-fitting elements, such as a tongue and groove connection.

As already explained above, the annular basic body has a mechanically supporting function for the focal track coating and takes on thermal functions (heat absorption and storage). It consists of carbon-based material, such as graphite, in particular. The focal track coating is preferably formed from at least one of the following materials:

i. tungsten,
ii. a tungsten-based alloy, and/or
iii. a carbide, nitride, carbonitride of at least one of the transition metals hafnium, tantalum or tungsten.

In particular, the focal track coating is formed from a tungsten-rhenium alloy which has a rhenium proportion of up to 26% by weight, with the rhenium proportion preferably being in a range between 5% and 15% by weight. Furthermore, the material of the focal track coating may also be a mixed carbide of two or more of these transition metals: hafnium, tantalum or tungsten, and may also be a mixed carbonitride of two or more of these transition metals. The thickness of the focal track coating is usually in the range from 0.05 to 2 mm. The focal track coating can be applied to the basic body by means of known technologies, such as by soldering the focal track coating onto the basic body or by known coating methods such as thermal spraying, plasma spraying, physical vapor deposition (PVD) or chemical vapor deposition (CVD). At least one intermediate layer, which may be metallic or ceramic, is preferably arranged between the focal track coating and the basic body. This intermediate layer supports the attachment and adhesion of the focal track coating to the basic body and may also be in the form, for example, of a barrier layer to suppress undesired diffusion of carbon into the focal track coating. Advantageously, the at least one intermediate layer also helps to suppress the propagation of cracks, which occur in the focal track coating during operation of the rotary x-ray anode due to interaction with high-energy electrons, in the direction of the basic body. In the case of a metallic intermediate layer, this layer is preferably formed from rhenium, molybdenum, tantalum, niobium, zirconium, titanium or compounds or alloys of these metals or combinations of these metals; ceramic intermediate layers are preferably formed from carbides, such as silicon carbide, or nitrides, such as boron nitride or titanium nitride. Instead of one intermediate layer, it is also possible for multiple intermediate layers to be arranged one above another and to form an intermediate layer stack. In particular, metallic and ceramic intermediate layers can alternate in the intermediate layer stack.

The invention is described in more detail on the basis of the following description of three exemplary embodiments with reference to the appended figures. In the figures, in a not-to-scale illustration:

DETAILED DESCRIPTION OF THE INVENTION

Figure 1A:
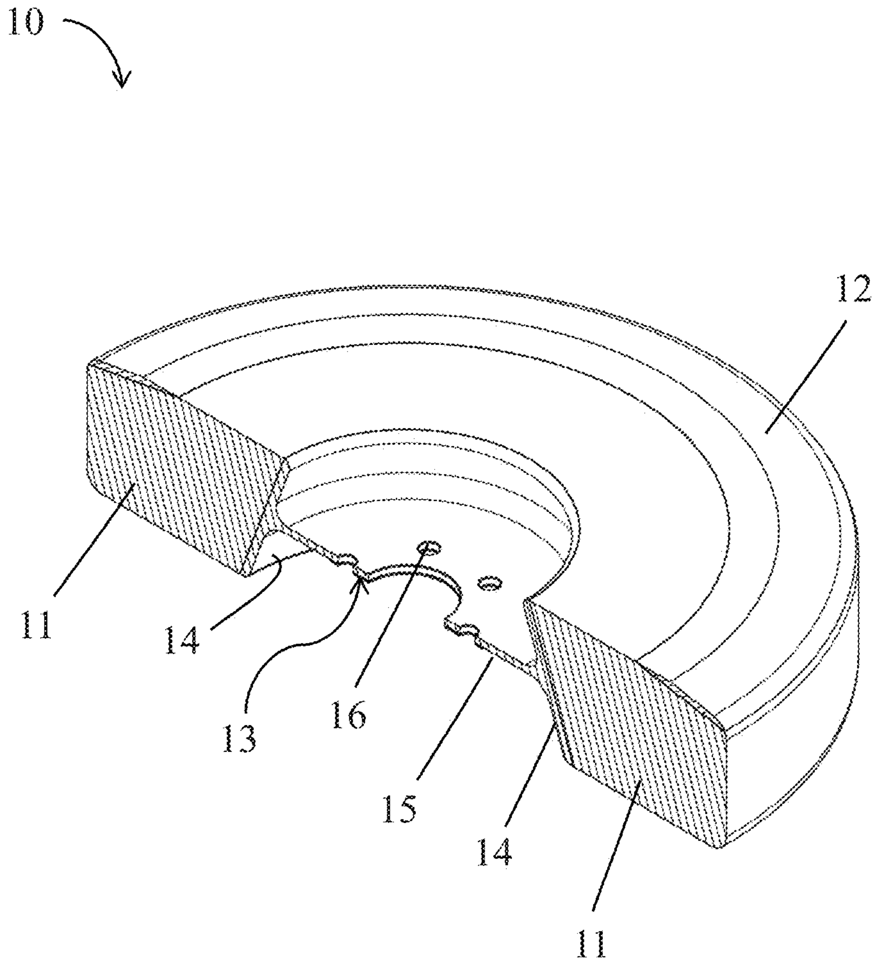
FIG. 1*a*: shows a perspective sectional illustration of a first embodiment variant of the rotary x-ray anode.

FIG. 1*a* shows a schematic perspective sectional illustration of a first embodiment variant of the rotary x-ray anode. The rotary x-ray anode 10 is rotationally symmetrical with respect to the axis of rotation R and consists of an annular basic body 11 of graphite, on the beveled end face of which an annular focal track coating 12 is arranged. Graphite has a comparatively low density and is distinguished by a comparatively high specific heat capacity. During operation, high-energy electrons are accelerated onto the focal track coating 12 in order to generate x-radiation. The focal track coating 12 consists of a tungsten-rhenium alloy with a rhenium proportion of approx. 10% by weight and is applied to the annular basic body 11 in the form of a spray layer. Optionally, for better adhesion and as a diffusion barrier against carbon diffusion, it is possible to arrange one or more intermediate layer(s) (not illustrated in FIG. 1*a*), in particular of rhenium, between the basic body 11 and the focal track coating 12. The annular basic body 11 can be connected to a drive shaft (not illustrated) via the radially inner metallic connecting component 13. In this respect, the openings 16 serve to accommodate screw connections for fastening on the drive shaft. The metallic connecting component 13 is composed of the tubular adapter 14 and the circular disk-shaped shaft connection component 15 and is located completely within the contour spanned by the basic body 11 both in a radial direction and in an axial direction. The tubular adapter 14 has a frustoconical basic shape with a cone angle 17 of approx. 160°, and its outer diameter decreases in the direction of the focal track side. The tubular adapter 14 is materially bonded on its radial outer surface to the radial inner surface of the annular basic body 11 by means of a soldered connection. Here, the materially bonded connecting zone between the annular basic body 11 and the tubular adapter 14 extends over the entire radial inner surface of the annular basic body 11. The tapering of the tubular adapter in the direction of the focal track side obtains a more uniform, approximately isothermal temperature distribution along the connecting zone between the tubular adapter 14 and the basic body 11. The temperature profile can be seen in FIG. 1*d*, which illustrates the temperature profile determined by means of a computer simulation. Lighter regions correspond to higher temperatures, while the temperature decreases as the shade of gray becomes darker. The temperature profile along the connecting zone between the tubular adapter 14 and the basic body 11 is approximately isothermal for typical operating parameters. The shaft connection component 15 meets the radial inner surface of the tubular adapter 14 centrally in a slightly rounded transition region. The metallic connecting component 13 (both the tubular adapter 14 and the circular disk-shaped shaft connection component 15) have a thin-walled configuration and are manufactured from a refractory metal, such as molybdenum or tungsten or an alloy on the basis of these metals (e.g. TZM, MHC), in terms of lowest possible thermal expansion.

Figure 1B:
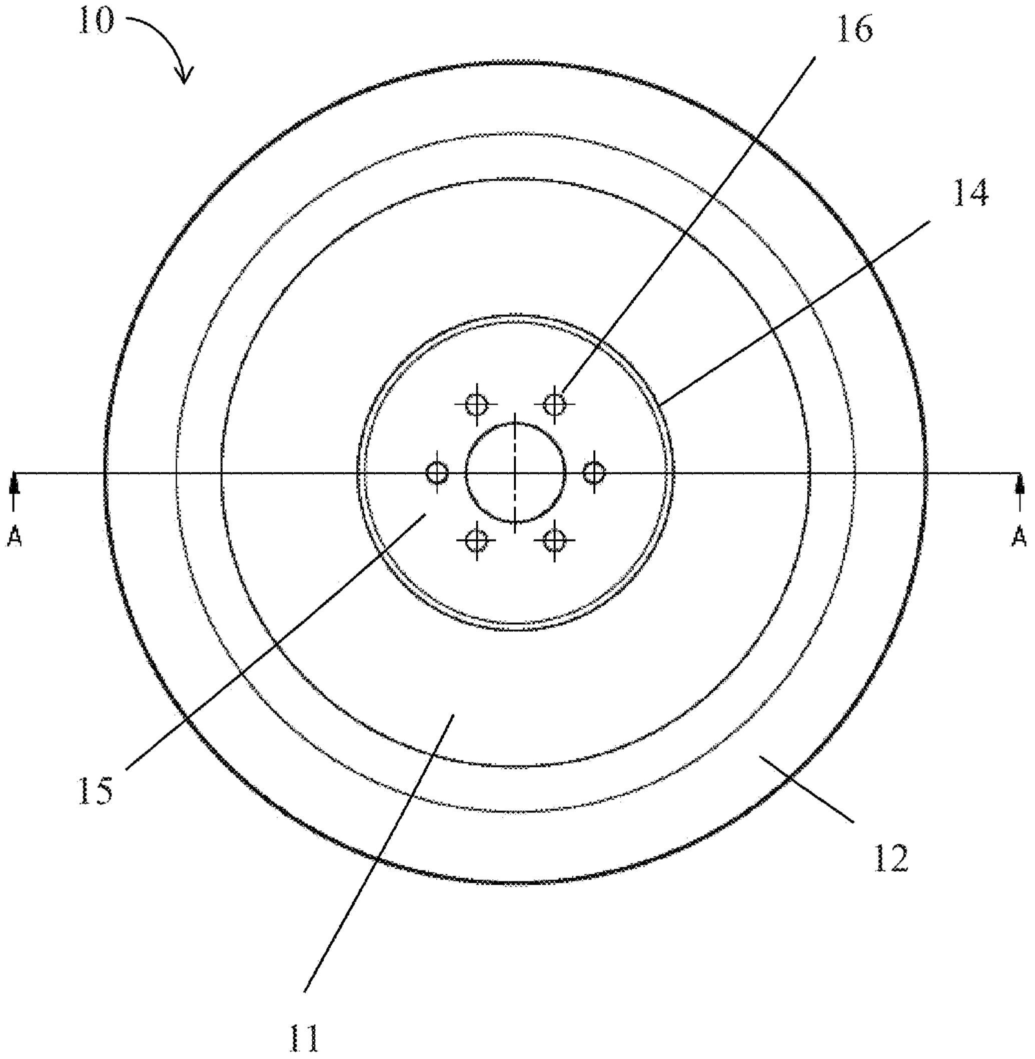
FIG. 1*b*: shows a plan view of the rotary x-ray anode of FIG. 1*a;*
Figure 1C:
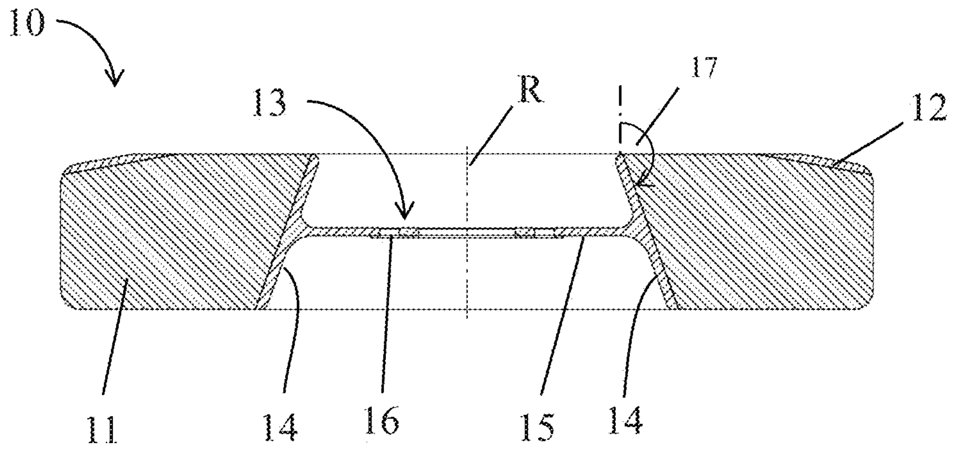
FIG. 1*c*: shows a radial sectional illustration of the rotary x-ray anode of FIG. 1*a* through the sectional plane A-A.
Figure 1D:
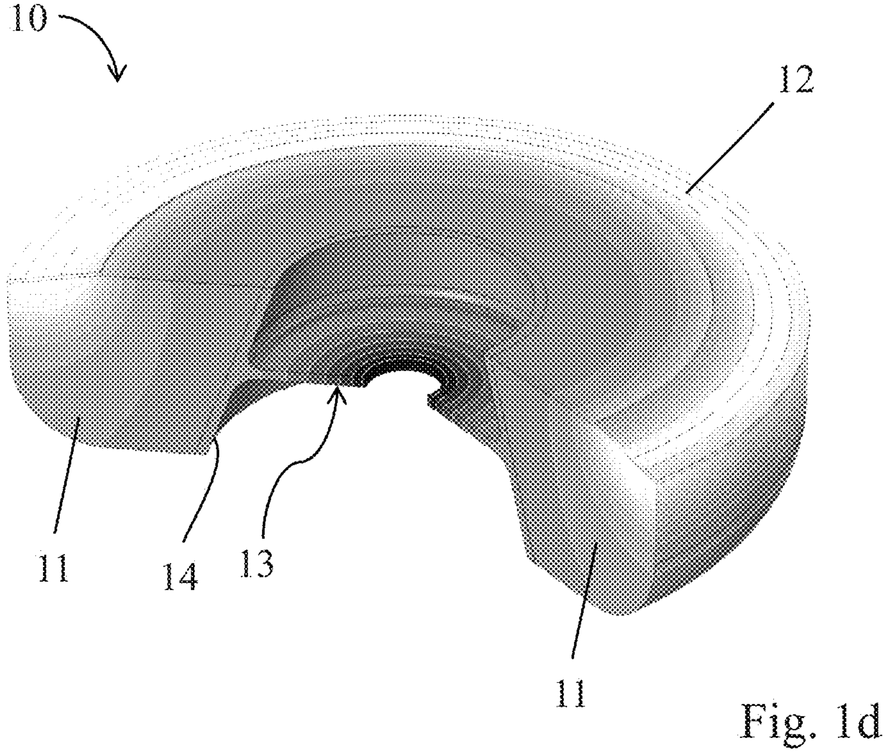
FIG. 1*d*: shows a temperature profile of the rotary x-ray anode from FIG. 1*a* in a perspective sectional illustration.
Figure 2A:
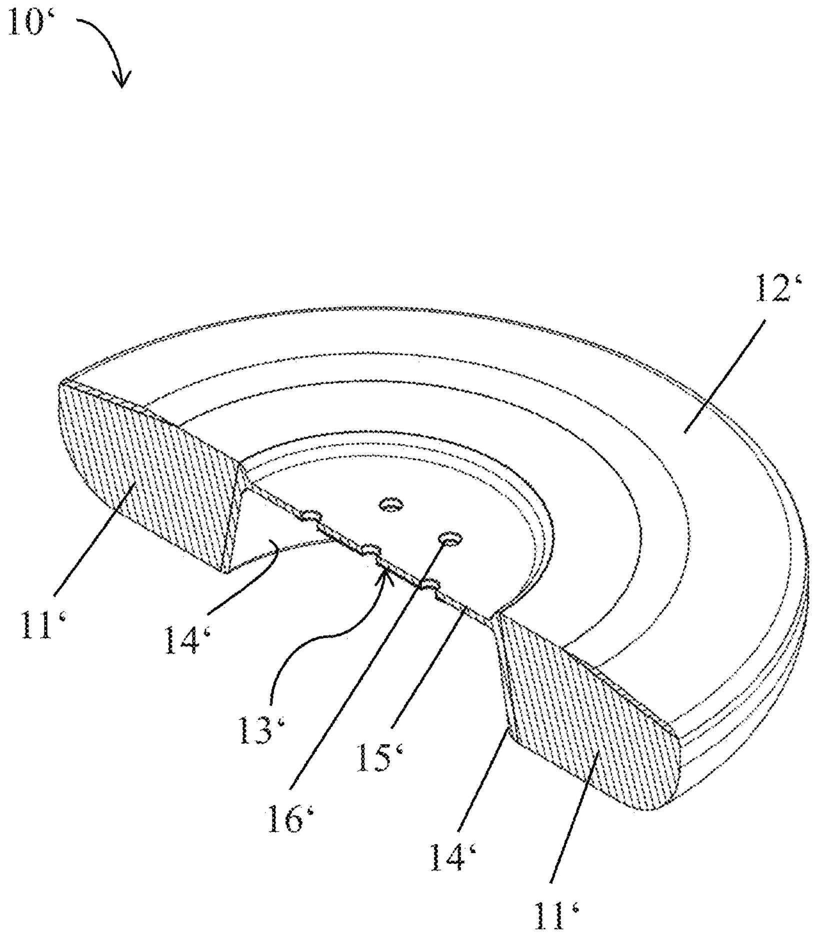
FIG. 2*a*: shows a perspective sectional illustration of a second embodiment variant of the rotary x-ray anode.
Figure 2B:
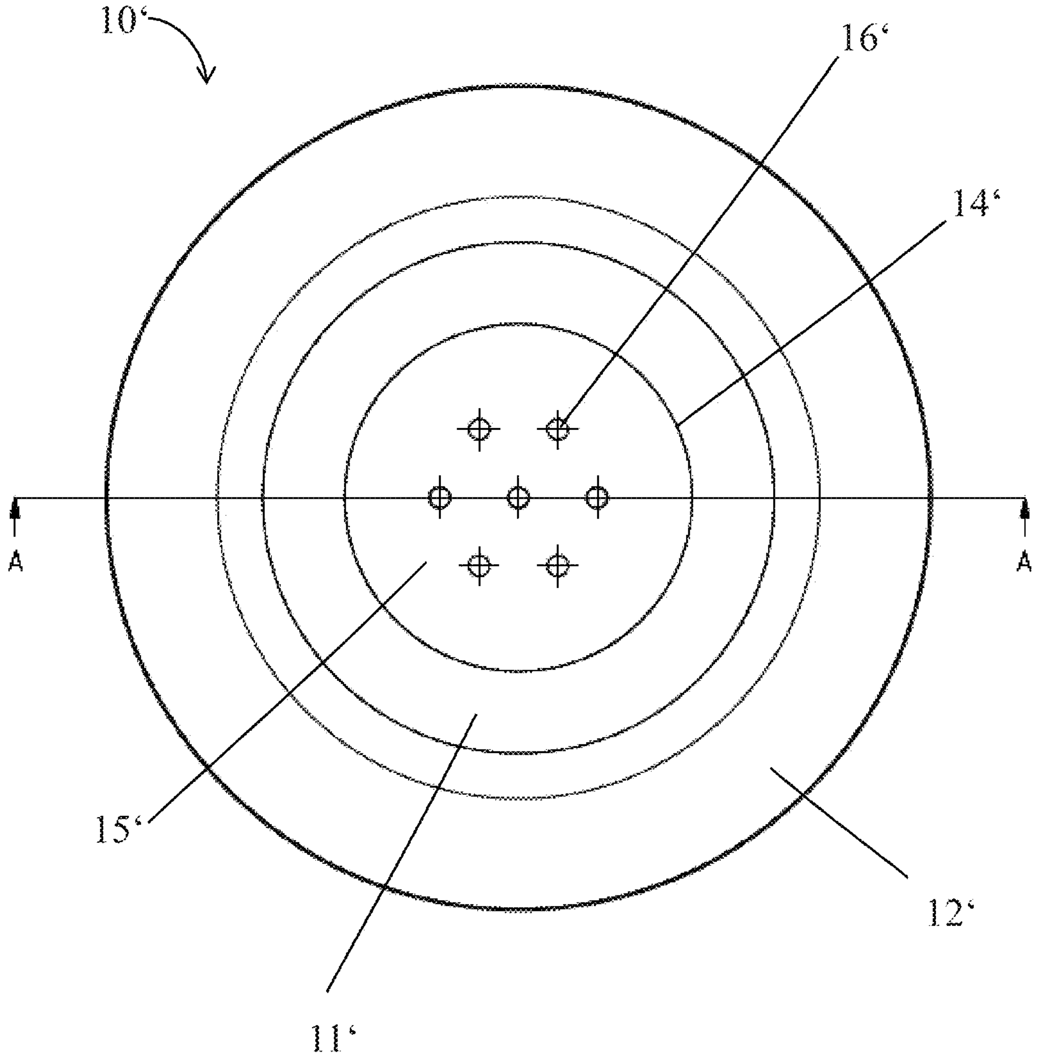
FIG. 2*b*: shows a plan view of the rotary x-ray anode of FIG. 2*a;*
Figure 2C:
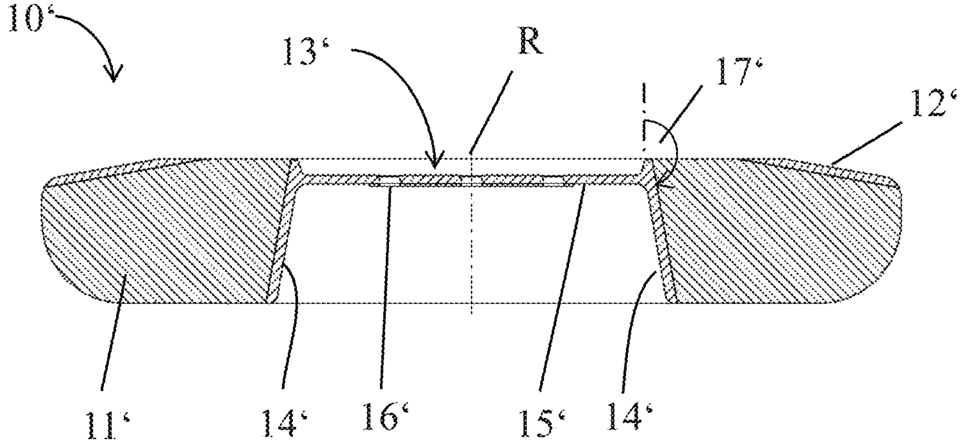
FIG. 2*c*: shows a radial sectional illustration of the rotary x-ray anode of FIG. 2*a* through the sectional plane A-A.

The rotary x-ray anode 10' illustrated in FIG. 2*a* to FIG. 2*c* has a somewhat wider focal track coating 12' and differs from the embodiment in FIG. 1*a* to FIG. 1*c* in terms of the shape of the annular basic body 11' (corners rounded to a greater extent). In comparison with the first embodiment, the annular adapter 14' has a slightly larger cone angle 17' (approx. 170°) and the shaft connection component 15' does not engage the adapter 14' centrally, but is offset in the direction of the focal track side.

Figure 3A:
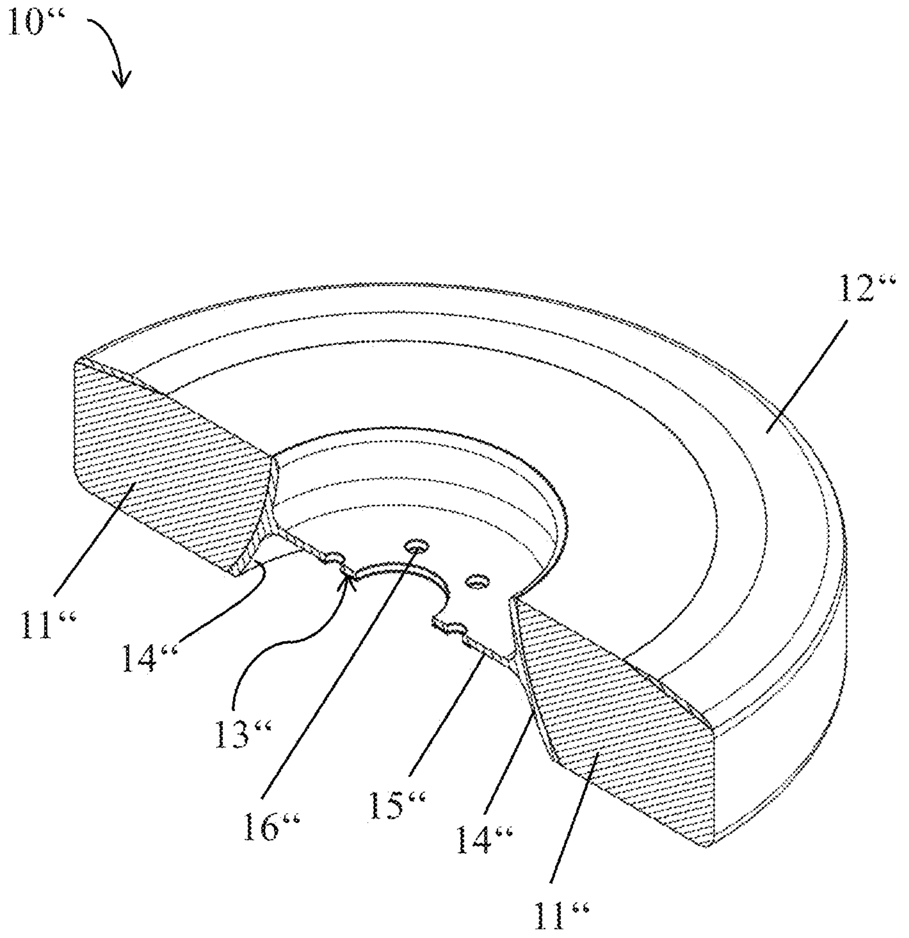
FIG. 3*a*: shows a perspective sectional illustration of a third embodiment variant of the rotary x-ray anode.
Figure 3B:
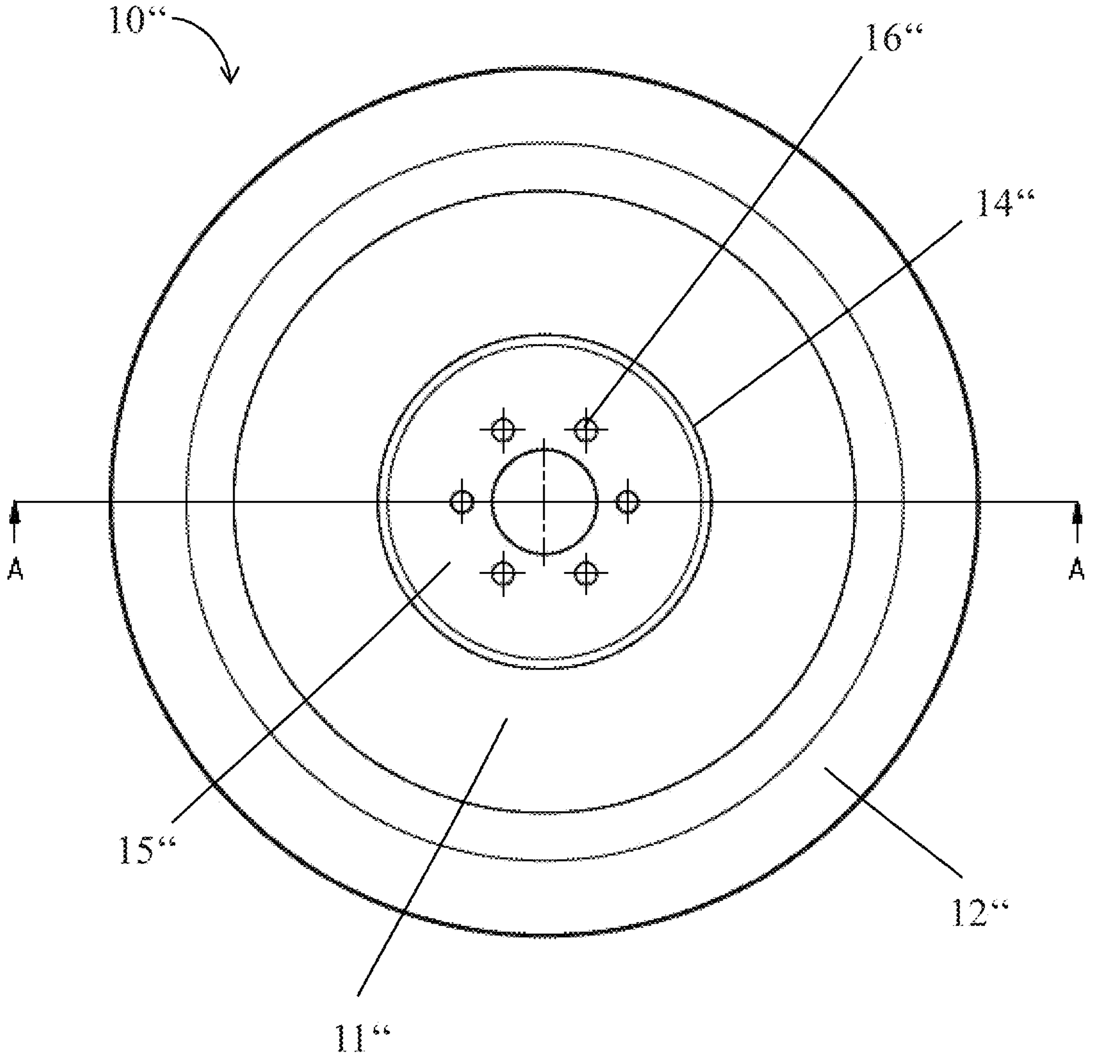
FIG. 3*b*: shows a plan view of the rotary x-ray anode of FIG. 3*a*.
Figure 3C:
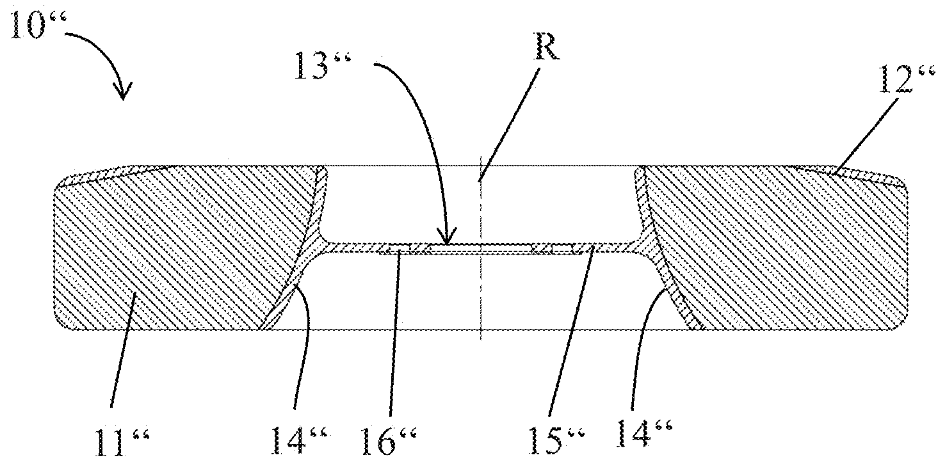
FIG. 3*c*: shows a radial sectional illustration of the rotary x-ray anode of FIG. 3*a* through the sectional plane A-A.

The rotary x-ray anode 10" illustrated in FIG. 3*a* to FIG. 3*c* has an adapter 14" with a toroidal basic shape, the contact surface of which with the basic body 11" opens out concavely to the outside. Overall, the adapter 14" tapers in the direction of the focal track side, analogously to the two previous embodiments.

All three rotary x-ray anodes 10, 10', 10" have a compact shape with a low mass and are distinguished by good thermomechanical properties. They have an advantageously high proportion by mass of the basic body serving as heat store. In addition, there is no metallic connection between the focal track coating and the radially inner region of the rotary x-ray anode.

The invention claimed is:

1. A rotary x-ray anode for generating x-radiation, the x-ray anode comprising:

an annular basic body of carbon-based material, said basic body having, with reference to an axis of rotation of the rotary x-ray anode, a radially inner opening with a radial inner surface;

an annular focal track coating arranged on a focal track side of said basic body;

a metallic connecting component arranged radially on an inside relative to said basic body and configured to connect said basic body to a drive shaft, a radially inner portion of said metallic connecting component being formed by a metallic shaft connection component;

said metallic connecting component having a radially outer portion formed by a tubular metallic adapter, said adapter having a frustoconical basic shape with a cone angle between >90° and <180° or between >180° and <270°, said adapter having a radial outer surface connected by a material bond to at least a portion of said radial inner surface of said basic body, and wherein a materially bonded connecting zone formed between said basic body and said adapter extends over at least 75 area percent along said radial inner surface of said basic body; and said metallic shaft connection component being connected on a radially outer circumference to the radial inner surface of said tubular metallic adapter, and said radially inner portion of said metallic shaft connection component being configured for connection to the drive shaft.

2. The rotary x-ray anode according to claim 1, wherein an outer circumference of said adapter decreases in an axial direction.

3. The rotary x-ray anode according to claim 1, wherein said adapter is rotationally symmetrical.

4. The rotary x-ray anode according to claim 1, wherein said metallic shaft connection component has a circular-disk-shaped basic shape and is arranged in a plane perpendicular to an axial direction.

5. The rotary x-ray anode according to claim 1, wherein said metallic shaft connection component has a frustoconical basic shape with a cone angle between 90° and 100° or between 260° and 270°.

6. The rotary x-ray anode according to claim 1, wherein said metallic shaft connection component is connected to said radial inner surface of said adapter in a range of 40% to 60% of a height of said adapter in an axial direction.

7. The rotary x-ray anode according to claim 1, wherein said metallic shaft connection component has a thin-walled configuration with a thickness in an axial direction of less than 10 mm.

8. The rotary x-ray anode according to claim 1, wherein a maximum thickness of said metallic shaft connection component in an axial direction is less than 20% of a height of said adapter in the axial direction.

9. The rotary x-ray anode according to claim 1, wherein said adapter has a thin-walled configuration with a thickness in a radial direction of less than 5 mm.

10. The rotary x-ray anode according to claim 1, wherein said adapter and said annular basic body are soldered to one another.

11. The rotary x-ray anode according to claim 1, wherein said metallic connecting component includes a heat restrictor being an intermediate component or an intermediate layer of a material with low thermal conductivity.

12. The rotary x-ray anode according to claim 1, wherein said metallic connecting component comprises at least one metal selected from the group consisting of tungsten, molybdenum, and copper, an alloy based on tungsten, molybdenum or copper, a tungsten-copper, a molybdenum-copper, or a copper composite material.

13. The rotary x-ray anode according to claim 1, wherein the focal track side carrying said focal track coating in a radially outer region of said annular basic body is beveled.

* * * * *